US008730894B2

(12) United States Patent
Sadri et al.

(10) Patent No.: US 8,730,894 B2

(45) Date of Patent: May 20, 2014

(54) VARIABLE BANDWIDTH OFDM RECEIVER AND METHODS FOR RECEIVING OFDM SIGNALS OF DIFFERENT BANDWIDTHS

(75) Inventors: Ali S Sadri, San Diego, CA (US); Alexander A. Maltsev, Nizhny Novgorod (RU); Sergey E Sergeyev, Nizhny Novgorod (RU); Alexei V Dayydov, Nizhny Novgorod (RU); Vadim S Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/267,134

(22) Filed: Oct. 6, 2011

(65) Prior Publication Data

US 2012/0026862 A1 Feb. 2, 2012

Related U.S. Application Data

(63) Continuation of application No. 12/611,289, filed on Nov. 3, 2009, now Pat. No. 8,045,449, which is a continuation of application No. 10/749,903, filed on Dec. 29, 2003, now Pat. No. 7,649,833.

(51) Int. Cl.

| | |
|---|---|
| ***H04W 4/00*** | (2009.01) |
| ***H04W 72/00*** | (2009.01) |
| ***H04W 28/04*** | (2009.01) |
| ***H04W 24/00*** | (2009.01) |

(52) U.S. Cl.

CPC .............. *H04W 28/04* (2013.01); *H04W 24/00* (2013.01)

USPC ......................... 370/329; 455/452.2; 455/513

(58) Field of Classification Search

CPC .............................. H04W 28/04; H04W 24/00

USPC ................. 370/208, 210, 334, 329, 252, 328; 455/450, 452.2, 513, 522

See application file for complete search history.

(56) References Cited

U.S. PATENT DOCUMENTS 5,479,447 A 12/1995 Chow et al.
5,610,908 A 3/1997 Shelswell et al.

(Continued)

FOREIGN PATENT DOCUMENTS

EP 1240918 A2 9/2002
EP 1253733 A1 10/2002

(Continued)

OTHER PUBLICATIONS

"U.S. Appl. No. 10/122,513, Final Office Action mailed Mar. 29, 2007", 32 pgs.

(Continued)

*Primary Examiner* — Phuongchau B Nguyen

(74) *Attorney, Agent, or Firm* — Schwegman, Lundberg & Woessner, P.A.

(57) ABSTRACT

A variable bandwidth OFDM receiver and methods for receiving OFDM signals of different bandwidths are generally disclosed herein. The variable bandwidth OFDM receiver may be configured to receive signals over wider bandwidths by processing a resource block of subcarriers comprising a greater number of subcarriers, and receive signals over narrower bandwidths by processing a resource block of subcarriers comprising a lesser number of subcarriers. The resource blocks have a number of OFDM symbols in a time dimension to define a time slot, and each wherein the resource block comprises a minimum number of subcarriers for a narrowest bandwidth for a predetermined minimum bandwidth reception and a predetermined maximum number of subcarriers for a maximum bandwidth reception. In some embodiments, the variable bandwidth receiver may operate in accordance with an 3GPP LTE E-UTRAN standard.

9 Claims, 7 Drawing Sheets

100 116 118 RF PART AS/ ADC 102a 102b 102c 102d 120a SCP 1 REMOVE GI 122a FFT-64 / CHANNEL 1 ESTIMATION 120b SCP 2 REMOVE GI 122b FFT-64 / CHANNEL 2 ESTIMATION 120c SCP 3 REMOVE GI 122c FFT-64 / CHANNEL 1 ESTIMATION 120d SCP 4 REMOVE GI 122d FFT-64 / CHANNEL 2 ESTIMATION 121 123 124 130a 130b 130c 130d 132 125 127 126a EQ1 126b EQ2 128 DEMAPPING DEINTERLEAVING FEC DECODING 129

(56) References Cited

U.S. PATENT DOCUMENTS

| | | | | |
|---|---|---|---|---|
| 5,668,810 | A | 9/1997 | Cannella, Jr. | |
| 6,061,405 | A | 5/2000 | Emami | |
| 6,178,158 | B1 | 1/2001 | Suzuki et al. | |
| 6,192,026 | B1 | 2/2001 | Pollack et al. | |
| 6,249,543 | B1 | 6/2001 | Chow | |
| 6,430,441 | B1 | 8/2002 | Levine | |
| 6,603,961 | B1 | 8/2003 | Kuroda | |
| 6,748,212 | B2 | 6/2004 | Schmutz et al. | |
| 6,795,424 | B1 | 9/2004 | Kapoor et al. | |
| 6,891,858 | B1 | 5/2005 | Mahesh et al. | |
| 6,985,434 | B2 | 1/2006 | Wu et al. | |
| 7,020,095 | B2 | 3/2006 | Chini et al. | |
| 7,020,212 | B1 | 3/2006 | Strait | |
| 7,065,171 | B1 | 6/2006 | Hilborn et al. | |
| 7,120,198 | B1 | 10/2006 | Dafesh et al. | |
| 7,124,193 | B1 | 10/2006 | Leung et al. | |
| 7,333,556 | B2 | 2/2008 | Maltsev et al. | |
| 7,440,510 | B2 | 10/2008 | Sandhu et al. | |
| 7,570,953 | B2 | 8/2009 | Maltsev et al. | |
| 7,649,833 | B2 * | 1/2010 | Sadri et al. | 370/208 |
| 8,045,449 | B2 * | 10/2011 | Sadri et al. | 370/208 |
| 8,270,435 | B2 * | 9/2012 | Olszewski | 370/468 |
| 2001/0031014 | A1 | 10/2001 | Subramanian et al. | |
| 2001/0031016 | A1 | 10/2001 | Seagraves | |
| 2001/0033623 | A1 | 10/2001 | Hosur | |
| 2001/0055952 | A1 | 12/2001 | Ficarra | |
| 2002/0009155 | A1 | 1/2002 | Tzannes | |
| 2002/0122383 | A1 | 9/2002 | Wu et al. | |
| 2002/0126694 | A1 | 9/2002 | Kahola | |
| 2002/0160737 | A1 | 10/2002 | Crawford | |
| 2002/0163495 | A1 | 11/2002 | Doynov | |
| 2002/0163879 | A1 | 11/2002 | Li et al. | |
| 2003/0043732 | A1 | 3/2003 | Walton et al. | |
| 2003/0072255 | A1 | 4/2003 | Ma et al. | |
| 2003/0083703 | A1 | 5/2003 | Zhu et al. | |
| 2003/0119534 | A1 | 6/2003 | Kostic et al. | |
| 2003/0125040 | A1 | 7/2003 | Walton et al. | |
| 2003/0139196 | A1 | 7/2003 | Medvedev et al. | |
| 2003/0165131 | A1 | 9/2003 | Liang et al. | |
| 2003/0204210 | A1 | 10/2003 | Ousdigian et al. | |
| 2003/0208241 | A1 | 11/2003 | Bradley et al. | |
| 2003/0223354 | A1 | 12/2003 | Olszewski | |
| 2004/0018843 | A1 | 1/2004 | Cerwall et al. | |
| 2004/0062193 | A1 * | 4/2004 | Ma et al. | 370/208 |
| 2004/0114506 | A1 * | 6/2004 | Chang et al. | 370/208 |
| 2004/0120274 | A1 | 6/2004 | Petre et al. | |
| 2004/0131011 | A1 * | 7/2004 | Sandell et al. | 370/210 |
| 2004/0258174 | A1 | 12/2004 | Shao et al. | |
| 2005/0020237 | A1 | 1/2005 | Alexiou et al. | |
| 2005/0031047 | A1 | 2/2005 | Maltsev et al. | |
| 2005/0068916 | A1 | 3/2005 | Jacobsen et al. | |
| 2005/0088959 | A1 | 4/2005 | Kadous | |
| 2005/0111424 | A1 | 5/2005 | Tsai et al. | |
| 2005/0113041 | A1 | 5/2005 | Polley et al. | |
| 2005/0141412 | A1 | 6/2005 | Sadri et al. | |
| 2005/0152465 | A1 | 7/2005 | Maltsev et al. | |
| 2005/0152466 | A1 | 7/2005 | Maltsev et al. | |
| 2005/0215264 | A1 | 9/2005 | Subramaniam et al. | |
| 2005/0245197 | A1 | 11/2005 | Kadous et al. | |
| 2005/0265281 | A1 | 12/2005 | Ketchum | |
| 2005/0276344 | A1 | 12/2005 | Ling et al. | |
| 2006/0029146 | A1 | 2/2006 | Catreux et al. | |
| 2006/0039312 | A1 | 2/2006 | Walton et al. | |
| 2006/0050623 | A1 | 3/2006 | Hartman, Jr. | |
| 2006/0067278 | A1 | 3/2006 | Li et al. | |
| 2006/0087972 | A1 | 4/2006 | Jalali et al. | |
| 2006/0135081 | A1 | 6/2006 | Mysore et al. | |
| 2006/0166634 | A1 | 7/2006 | Ido | |
| 2010/0046671 | A1 | 2/2010 | Sadri et al. | |
| 2011/0255629 | A1 * | 10/2011 | Ko et al. | 375/285 |

FOREIGN PATENT DOCUMENTS

| | | | |
|---|---|---|---|
| EP | 1411647 | A2 | 4/2004 |
| GB | 2384651 | | 7/2003 |
| JP | 02971814 | | 11/1999 |
| JP | 2002330467 | A | 11/2002 |
| JP | 2003110536 | | 4/2003 |
| JP | 2003244043 | A | 8/2003 |
| JP | 2003283405 | | 10/2003 |
| JP | 5043884 | B2 | 10/2012 |
| WO | WO-9741675 | A1 | 11/1997 |
| WO | WO-03001702 | A1 | 1/2003 |
| WO | WO-03047198 | A2 | 6/2003 |
| WO | WO-03073682 | A1 | 9/2003 |
| WO | WO-03077491 | A1 | 9/2003 |
| WO | WO-2004047354 | A1 | 6/2004 |
| WO | WO-2005015769 | A2 | 2/2005 |
| WO | WO-2005067171 | A1 | 7/2005 |
| WO | WO-2005071912 | A1 | 8/2005 |
| WO | WO-2005122515 | A1 | 12/2005 |

OTHER PUBLICATIONS

"U.S. Appl. No. 10/122,513, Final Office Action mailed Jul. 24, 2006", 31 pgs.

"U.S. Appl. No. 10/122,513, Non-Final Office Action mailed Dec. 4, 2006", 34 pgs.

"U.S. Appl. No. 10/122,513, Non-Final Office Action mailed Apr. 4, 2006", 24 pgs.

"U.S. Appl. No. 10/122,513, Response filed Dec. 22, 2006 Non-Final Office Action mailed Dec. 4, 2006", 12 pgs.

"U.S. Appl. No. 10/122,513, Response filed May 18, 2006 Non-Final Office Action mailed Apr. 4, 2006", 18 pgs.

"U.S. Appl. No. 10/122,513, Response filed Aug. 31, 2006 to Final Office Action mailed Jul. 24, 2006", 17 pgs.

"U.S. Appl. No. 10/749,903, Non-Final Office Action mailed Jan. 8, 2009", 36 pgs.

"U.S. Appl. No. 10/749,903, Non-Final Office Action Mailed Aug. 7, 2008", 30 pgs.

"U.S. Appl. No. 10/749,903, Notice of Allowance mailed Aug. 24, 2009", 10 Pgs.

"U.S. Appl. No. 10/749,903, Response filed Feb. 25, 2009 to Non-Final Office Action mailed Jan. 8, 2009", 11 pgs.

"U.S. Appl. No. 10/749,903, Response filed Mar. 14, 2008 to Non-Final Office Action mailed Jan. 25, 2008", 18 pgs.

"U.S. Appl. No. 10/749,903, Response filed Oct. 14, 2008 to Non-Final Office Action mailed Aug. 7, 2008", 17 pgs.

"U.S. Appl. No. 10/749,903, Supplemental Notice of Allowability Mailed Dec. 7, 2009", 4 Pgs.

"U.S. Appl. No. 10/749,903, Non-Final Office Action mailed Jan. 25, 2008", 33 Pages.

"U.S. Appl. No. 10/815,035, Non-Final Office Action mailed May 25, 2007", 11 pgs.

"U.S. Appl. No. 10/815,035, Response filed Jul. 24, 2007 to Non-Final Office Action mailed May 25, 2007", 26 pgs.

"U.S. Appl. No. 10/862,535, Final Office Action mailed Jul. 8, 2008", 19 pgs.

"U.S. Appl. No. 10/862,535, Non-Final Office Action mailed Dec. 14, 2007", OARN, 23 pgs.

"U.S. Appl. No. 10/862,535, Notice of Allowance mailed Mar. 23, 2009", 7 pgs.

"U.S. Appl. No. 10/862,535, Preliminary Amendment filed Jun. 7, 2004", 14 pgs.

"U.S. Appl. No. 10/862,535, Response filed Feb. 15, 2008 to Non-Final Office Action mailed Dec. 14, 2007", 20 pgs.

"U.S. Appl. No. 10/862,535, Response filed Sep. 24, 2008 to Final Office Action mailed Jul. 8, 2008", 16 pgs.

"U.S. Appl. No. 10/880,158, Non-Final Office Action mailed Apr. 1, 2008", OARN, 8 pgs.

"U.S. Appl. No. 10/880,158, Notice of Allowance mailed Jun. 17, 2008", 10 pgs.

"U.S. Appl. No. 10/880,158, Preliminary Amendment filed Jul. 29, 2004", 3 pgs.

(56) References Cited

OTHER PUBLICATIONS

"U.S. Appl. No. 10/880,158, Response filed May 27, 2008 to Non-Final Office Action mailed Apr. 1, 2008", 11 pgs.
"U.S. Appl. No. 10/880,158, Supplemental Notice of Allowability mailed Jul. 11, 2008", 4 pgs.
"U.S. Appl. No. 10/880,158, Supplemental Preliminary Amendment filed Nov. 18, 2004", 3 pgs.
"U.S. Appl. No. 12/611,289, Non Final Office Action mailed May 11, 2011", 14 pgs.
"U.S. Appl. No. 12/611,289, Notice of Allowance mailed Jul. 1, 2011", 9 pgs.
"U.S. Appl. No. 12/611,289, Response filed May 13, 2011 to Non Final Office Action mailed May 11, 2011", 8 pgs.
"U.S. Appl. No. 10/880,158, Second Supplemental Preliminary Amendment filed Jan. 29, 2008", 9 pgs.
"Chinese Application Serial No. 200480039413.5, Office Action mailed Apr. 16, 2009", 34 pgs.
"Chinese Application Serial No. 200580018258.3, Office Action mailed Mar. 27, 2009", 99 pgs.
"European Application Serial No. 04815170.8, Office Action mailed Feb. 17, 2010", 4 pgs.
"European Application Serial No. 04815170.8, Office Action mailed Jan. 19, 2011", 6 pgs.
"European Application Serial No. 10193166.5, Extended European Search Report mailed Jan. 17, 2011", 11 pgs.
"International Application Serial No. PCT/US2004/043056, International Search Report mailed Apr. 1, 2005", 4 pgs.
"International Application Serial No. PCT/US2005/017773, International Search Report mailed Sep. 13, 2005", 3 pgs.
"Japanese Application Serial No. P2006-542902, Office Action mailed Sep. 29, 2008 filed on Dec. 20, 2004, titled "Multicarrier Receiver With Antenna Selection and Maximum-Ratio Combining" (unpublished)", 6 pgs.
"Japanese Application Serial No. P2006-542902, Office Action mailed Feb. 2, 2009", 7 pgs.
"Notice of Allowance and Fee(S) Due mailed Sep. 25, 2007 in U.S. Appl. No. 10/815,035, 10 pgs", NOAR, 10 Pages.
"Supplement to IEEE standard for information technology—telecommunications and information exchange between systems—local and metropolitan area networks—specific requirements. Par II: wireless LAN Medium Access Control (MAC) and Physical Layer (PHY) specifi", IEEE STD 802.11a-1999, IEEE Computer Society, New York, NY, (1999), 91 pgs.
"Written Opinion for corresponding PCT Application Serial No. PCT/US2004/043056", (Apr. 1, 2005), 9 pgs.
Abdul Aziz, M. K.A., et al., "Indoor throughput and range improvements using standard compliant AP antenna diversity in IEEE 802.11a and ETSI HIPERLAN/2", VTC 2001 Fall. IEEE VTS 54th Vehicular Technology Conference, 2001, vol. 4, (Oct. 7-11, 2001), 2294-2298.
Bangerter, B., et al., "High-Throughput Wireless LAN Air Interface", Intel Technology Journal, 7(3), http://developer.intel.com/technology/itj/index.htm, (Aug. 9, 2003), 47-57.
Bansal, Prateek, et al., "Adaptive Loading in MIMO/OFDM Systems", (Dec. 13, 2001) http://web.mit.edu/brzezin/www/359/359.pdf, (Observed Sep. 2003), 12 pgs.
Choi, Byoungjo, et al., "Optimum mode-switching-assisted constant-power single- and multicarrier adaptive modulation", IEEE Transactions on Vehicular Technology, 52(3), (May 2003), 536-560.
Cioffi, John M., "Chapter 4—Multi-Channel Modulation", Lectures on Digital Communications, Stanford University, Available from http://www.stanford.edu/class/ee379c/, (2001), 278-314.
Dammann, A., et al., "Transmit/Receive—Antenna—Diversity Techniques for OFDM Systems", European Transactions on Telecommunications, 13 (5), Multi-Carrier Spread-Spectrum and Related Topics, (Sep. 2002), 531-538.
Ergen, M., et al., "QoS Aware Adaptive Subcarrier Allocation in OFDMA Systems", ((Observed Sep. 2003)), 26 pgs.
Fischer, R. F. H, et al., "A New Loading Algorithm for Discrete Multitone Transmission", Global Telecommunications Conference, 1996. Globecom '96. Communications: The Key to Global Prosperity London, UK 18-22, vol. 1, (Nov. 18, 1996), 724-728.
Fujino, Y., et al., "Transmitter With Antenna Array for MC-CDMA Forward Link", IEEE Antennas and Propagation Society International Symposium, (Jun. 22, 2003), 847-850.
Hao, Y, et al., "An adaptive array antenna with path selection of OFDM signal", European Personal Mobile Communications Conference, (Apr. 22, 2003), 412-416.
Nutter, A. A, et al., "Effects of Fading Correlation on Multiple Antenna Reception Mobile OFDM Systems", IEEE Vehicular Technology Conference, (Sep. 24, 2000), 2744-2749.
Jarot, S. P. W., et al., "Each Carrier Transmission Power Control with Antenna Carrier Diversity for OFDM/DS-CDMA System", Telecommunications, Eurel Publication, 11(6), (Nov. 1, 2000), 539-546.
Leke, A, et al., "A maximum rate loading algorithm for discrete multitone modulation systems", GLOBECOM '97, Global Telecommunications Conference, 1997, vol. 3, (Nov. 8, 1997), 1514-1518.
Qinqjiang, T L, "The performance of multi-carrier CDMA with base station antenna arrays in fading channels", Vehicular Technology Conference, (May 15, 2000), 1498-1502.
Sandhu, S., et al., "Analog Combining of Multiple Receive Antennas With OFDM", IEEE International Conference on Communications, (May 11, 2003), 3428-3432.
Simoens, S, et al., "Optimum performance of link adaptation in HIPERLAN/2 networks", IEEE 53rd Vehicular Technology Conference, (VTC 2001), vol. 2 of 4, (May 6-9, 2001), 1129-1133.
Slimane, B. S, "A Low Complexity Antenna Diversity Receiver for OFDM Based Systems", IEEE International Conference on Communications, (Jun. 6, 2001), 1147-1151.
Tian, Q., et al., "The Performance of Multi-Carrier CDMA with Base Station Antenna Arrays in fading channels", Vehicular Technology Conference, (May 15, 2000), 1498-1502.
Yih, C H, et al., "Adaptive Modulation, Power Allocation and Control for OFDM Wireless Networks", Personal, Indoor and Mobile Radio Communication, 2, (Sep. 18, 2000), 809-813.
Ying, C L, et al., "Sub-channel grouping and statistical water-filling for MIMO-OFDM systems", vol. 1, Asilomar Conference on Signals,Systems and Computers, (Nov. 9, 2003), 997-1001.
Yuan, H., et al., "An Adaptive Array Antenna with Path Selection of OFDM Signal", European Personal Mobile Communications Conference,, (Apr. 22, 2003), 412-416.
Zhen, L., et al., "A Modified Sub-Optimum Adaptive Bit and Power Allocation Algorithm in Wideband OFDM System", Canadian Conference on Electrical and Computer Engineering,(CCECE 2003), vol. 3 of 3, (May 4, 2003), 1589-1592.
"U.S. Appl. No. 10/862,535, Advisory Action mailed Oct. 28, 2008", 3 pgs.
"Application Serial No. 200480039413.5, Response filed Mar. 8, 2012", 8 pgs.
"Chinese Application Serial No. 200480039413.5, Office Action mailed Nov. 24, 2011", W/English Translation, 31 pgs.
"European Application Serial No. 04815170.8, Examination Notification of Art. 94(3) mailed Sep. 14, 2011", 5 pgs.
"European Application Serial No. 04815170.8, Response filed Feb. 27, 2012 to Office Action mailed Sep. 14, 2011", 3 pgs.
"European Application Serial No. 04815170.8, Response filed May 25, 2011 to Office Action mailed Jan. 19, 2011", 5 pgs.
"European Application Serial No. 10193166.5, Examination Notification of Art. 94(3) mailed Sep. 12, 2011", 4 pgs.
"European Application Serial No. 10193166.5, Office Action Response filed Mar. 19, 2012", 7 pgs.
"European Application Serial No. 12155615.3, Extended European Search Report Mailed Mar. 9, 2012", 7 Pgs.
"European Application Serial No. 12155615.3, Response filed Nov. 21, 2012 to European Search Report mailed May 29, 2012", 16 pgs.
"International Application Serial No. PCT/US2004/043056, International Preliminary Report on Patentability mailed Jul. 13, 2006", 9 pgs.
"International Application Serial No. PCT/US2004/043056, International Search Report and Written Opinion mailed Apr. 1, 2005", 14 pgs.

(56) References Cited

OTHER PUBLICATIONS

"International Application Serial No. PCT/US2005/000934, International Preliminary Report on Patentability mailed Jul. 27, 2006", 9 pgs.

"International Application Serial No. PCT/US2005/000934, International Search Report and Written Opinion mailed Jul. 6, 2005", 14 pgs.

"Japanese Application Serial No. 2009-100175, Response filed May 25, 2012 to Office Action mailed Feb. 22, 2012", 4 pgs.

"Japanese Application Serial No. P2006-542902, Response filed Apr. 17, 2009", w/English Claims, 7 pgs.

"Japanese Application Serial No. P2006-542902, Response filed Dec. 20, 2008", 4 pgs.

"Japanese Application Serial No. P2009-1007175, Office Action mailed Feb. 27, 2012", w/English Translation, 4 pgs.

"European Application Serial No. 10193166.5, Examination Notification Art, 94(3) mailed Jul. 1, 2013", 4 pgs.

"European Application Serial No. 10193166.5, Office Action mailed Apr. 22, 2013", 3 pgs.

"European Application Serial No. 10193166.5, Response filed Jun. 20, 2013 to Examination Notification Art. 94(3) mailed Apr. 22, 2013", 8 pgs.

"European Application Serial No. 10193166.5, Response filed Oct. 31, 2013 to Office Action mailed Jul. 1, 2013", 13 pgs.

* cited by examiner

VARIABLE BANDWIDTH OFDM RECEIVER AND METHODS FOR RECEIVING OFDM SIGNALS OF DIFFERENT BANDWIDTHS

PRIORITY CLAIM

This application is a continuation of U.S. patent application Ser. No. 12/611,289, filed on Nov. 3, 2009, now issued as U.S. Pat. No. 8,045,449, which is a continuation of U.S. patent application Ser. No. 10/749,903, filed on Dec. 29, 2003, now issued as U.S. Pat. No. 7,649,833, both of which are incorporated herein by reference in their entireties.

TECHNICAL FIELD

Embodiments pertain to wireless communications, and some embodiments pertain to orthogonal frequency division multiplexed (OFDM) communications.

BACKGROUND

Many modern digital communication systems, including wireless local-area networks (WLANs), are using symbol-modulated orthogonal subcarriers as a modulation scheme to help signals survive in environments having multipath reflections and/or strong interference. Orthogonal frequency-division multiplexing (OFDM) is an example of a multi-carrier transmission technique that uses symbol-modulated orthogonal subcarriers to transmit information within an available spectrum.

One problem with many WLAN receivers, including OFDM receivers, is that they are limited by their hardware configuration as to the particular channels they can receive as well as the bandwidth of those channels. This leaves such receivers inflexible as to tradeoffs between throughput and range. WLAN receivers, including OFDM receivers, should be able to receive both legacy channels, such as channels in accordance with Institute of Electrical and Electronics Engineers (IEEE) standard 802.11 (a), as well as wideband channels for high-throughput operations. These requirements make it difficult to make tradeoffs between throughput and range, especially when operating in high-throughput and/or wideband modes. Thus, there are general needs for transceivers, including receivers, and methods of communicating OFDM signals that provide flexibility between throughput and range in WLANs.

DETAILED DESCRIPTION

Figure 1A:
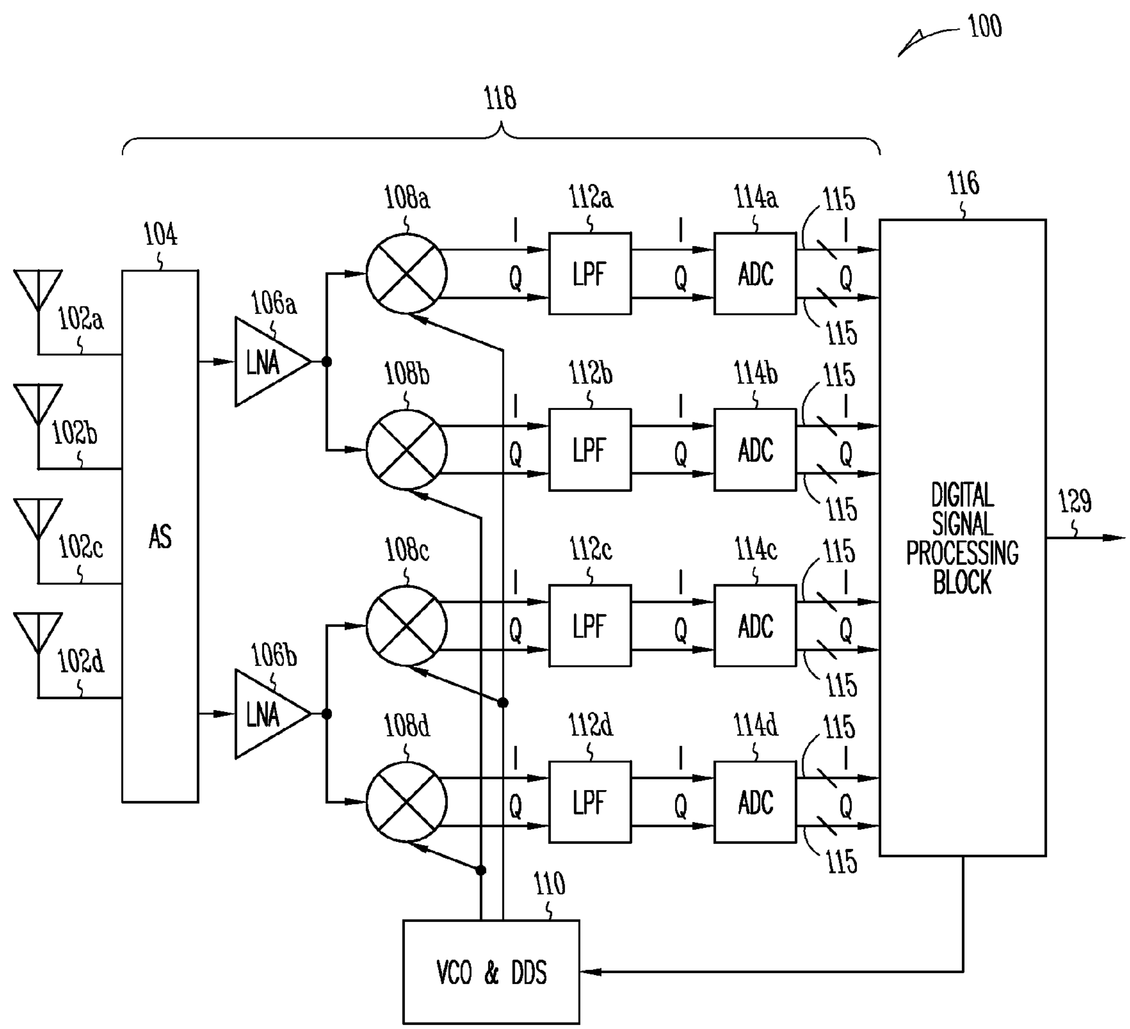
FIGS. 1A & 1B are block diagrams of a receiver in accordance with some embodiments.

The following description and the drawings illustrate specific embodiments sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others.

FIGS. 1A & 1B, FIGS. 2A & 2B, and FIGS. 3A & 3B illustrate some embodiments of various receiver configurations in accordance with some embodiments. Receiver configurations 100 (FIGS. 1A & 1B), 200 (FIGS. 2A & 2B) and 300 (FIGS. 3A & 3B) may be part of a wireless communication device, and they may receive orthogonal frequency division multiplexed (e.g., OFDM) communication signals. In some embodiments, the receivers may receive an OFDM packet comprising several OFDM symbols over a wideband communication channel. The wideband channel may comprise one or more subchannels. The subchannels may be frequency-division multiplexed (i.e., separated in frequency) and may be within a predetermined frequency spectrum. The subchannels may comprise a plurality of orthogonal subcarriers. In some embodiments, the orthogonal subcarriers of a subchannel may be closely spaced OFDM subcarriers. To achieve orthogonality between closely spaced subcarriers, in these embodiments, the subcarriers of a particular subchannel may have a null at substantially a center frequency of the other subcarriers of that subchannel.

Receiver configurations 100 (FIGS. 1A & 1B), 200 (FIGS. 2A & 2B) and 300 (FIGS. 3A & 3B) may be reconfigurable multichannel receivers that may selectively operate in increased throughput modes and/or increased range modes. In some embodiments, receiver configuration 100 (FIGS. 1A & 1B) may select two or more antennas from a plurality of spatially diverse antennas to receive more than one subchannel of a wideband OFDM channel. Maximum-ratio combining may be performed on corresponding symbol-modulated subcarriers from the two or more antennas, and a single OFDM symbol may be determined from contributions from the subchannels received by the two or more antennas. In other embodiments, receiver configuration 200 (FIGS. 2A & 2B) may receive more than one subchannel of a wideband OFDM channel with a single antenna selected from a plurality of spatially diverse antennas. In some other embodiments, receiver configuration 300 (FIGS. 3A & 3B) may receive a single subchannel with more than one of a plurality of spatially diverse antennas and maximum-ratio combining may be performed on corresponding symbol-modulated subcarriers received by the different antennas.

In accordance with some embodiments, receiver configurations 100 (FIGS. 1A & 1B), 200 (FIGS. 2A & 2B) and 300 (FIGS. 3A & 3B) may receive symbol-modulated subcarriers in accordance with individual subcarrier modulation assignments. This may be referred to as adaptive bit loading (ABL). Accordingly, one or more bits may be represented by a symbol modulated on a subcarrier. The modulation assignments for the individual subchannels may be based on the channel characteristics or channel conditions for that subcarrier, although the scope of the embodiments is not limited in this respect. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-

QAM, which communicates eight bits per symbol. Modulation orders with higher data communication rates per subcarrier may also be used.

An OFDM symbol may be viewed as the combination of the symbols modulated on the individual subcarriers. Because of the variable number of bits per symbol-modulated subcarrier and the variable number of subchannels that may comprise a wideband channel, the number of bits per OFDM symbol received by the receivers may vary greatly. For example, in some embodiments, a receiver may receive over a wideband channel that may comprise up to four or more subchannels having bandwidths of approximately 20 MHz, and each of the subchannels may have up to 48 or more orthogonal data subcarriers having a spacing therebetween of approximately 312.5 kHz. In other embodiments, a receiver may receive an OFDM symbol over a single subchannel.

In some embodiments, the frequency spectrums for a wideband channel may comprise subchannels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the embodiments is not limited in this respect, as other frequency spectrums are also equally suitable.

In some embodiments, receiver configurations 100 (FIGS. 1A & 1B), 200 (FIGS. 2A & 2B) and 300 (FIGS. 3A & 3B) may be part of a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, the receivers may receive radio-frequency communications in accordance with specific communication standards, such as the Institute of Electrical and Electronics Engineers (IEEE) standards including the IEEE 802.11(a), 802.11(b), 802.11(g/h) and/or 802.16 standards for wireless local area network communications, although the receivers may also be suitable to receive communications in accordance with other techniques including the Digital Video Broadcasting Terrestrial (DVB-T) broadcasting standard, and the High performance radio Local Area Network (HiperLAN) standard.

In some embodiments, the receivers may use up to four spatially diverse antennas to exploit up to four 20 MHz channels. In some embodiments, a 20 MHz channel may be referred to as a single subchannel of a wideband channel.

In accordance with some embodiments of receiver configuration 100 (FIGS. 1A & 1B), two 20 MHz subchannels may be used to support wideband channel operation of 40 MHz bandwidth with adaptive maximum-ratio combining on each subcarrier involving two active antennas. In some of these embodiments, receiver configuration 100 may simultaneously implement an antenna selection technique that chooses a pair of active antennas with the best receiving conditions from four antennas. These embodiments may provide a throughput of up to 108 Mbps with mid-range operation capabilities, although the scope of the embodiments is not limited in this respect. In some embodiments, receiver configuration 100 may be part of a transceiver that may choose the two least loaded subchannels of four subchannels for data transmission to help reduce collisions.

In accordance with some embodiments of receiver configuration 200 (FIGS. 2A & 2B), four 20 MHz subchannels may be used to support wideband channel operations of 80 MHz bandwidth with adaptive antenna selection that may choose one antenna with the best receiving conditions of four antennas for transmitting and/or receiving. These embodiments may provide a throughput of up to 216 Mbps with a possible reduction in range, although the scope of the embodiments is not limited in this respect.

In accordance with some embodiments of receiver configuration 200 (FIGS. 2A & 2B), three 20 MHz subchannels may be used to support wideband channel operation of 60 MHz bandwidth with adaptive antenna selection that may choose one antenna with the best receiving conditions of four for transmitting and/or receiving. These embodiments may provide a throughput up to 162 Mbps with an improved range, although the scope of the embodiments is not limited in this respect.

In accordance with some embodiments of receiver configuration 300 (FIGS. 3A & 3B), one subchannel may be received with four antennas with adaptive maximum-ratio combining on each subcarrier. In these embodiments, receiver configuration 300 may support transceiver configurations with possibly significantly improved range capabilities and throughput of up to 54 Mbps, although the scope of the embodiments is not limited in this respect. In some embodiments, receiver configuration 300 may be part of a transceiver that may choose a least loaded subchannel of four band subchannels for data transmission to help reducing collisions.

Although receiver configurations 100 (FIGS. 1A & 1B), 200 (FIGS. 2A & 2B) and 300 (FIGS. 3A & 3B) are illustrated separately, in some embodiments, a single reconfigurable receiver that may operate in accordance with the functionality of receiver configurations 100 (FIGS. 1A & 1B), 200 (FIGS. 2A & 2B) and 300 (FIGS. 3A & 3B) is provided. In addition, embodiments also include transceivers that comprise transmitter circuitry, as well as receiver circuitry, to transmit communication signals that may be received by receivers in accordance with receiver configurations 100 (FIGS. 1A & 1B), 200 (FIGS. 2A & 2B) and/or 300 (FIGS. 3A & 3B).

Figure 1B:
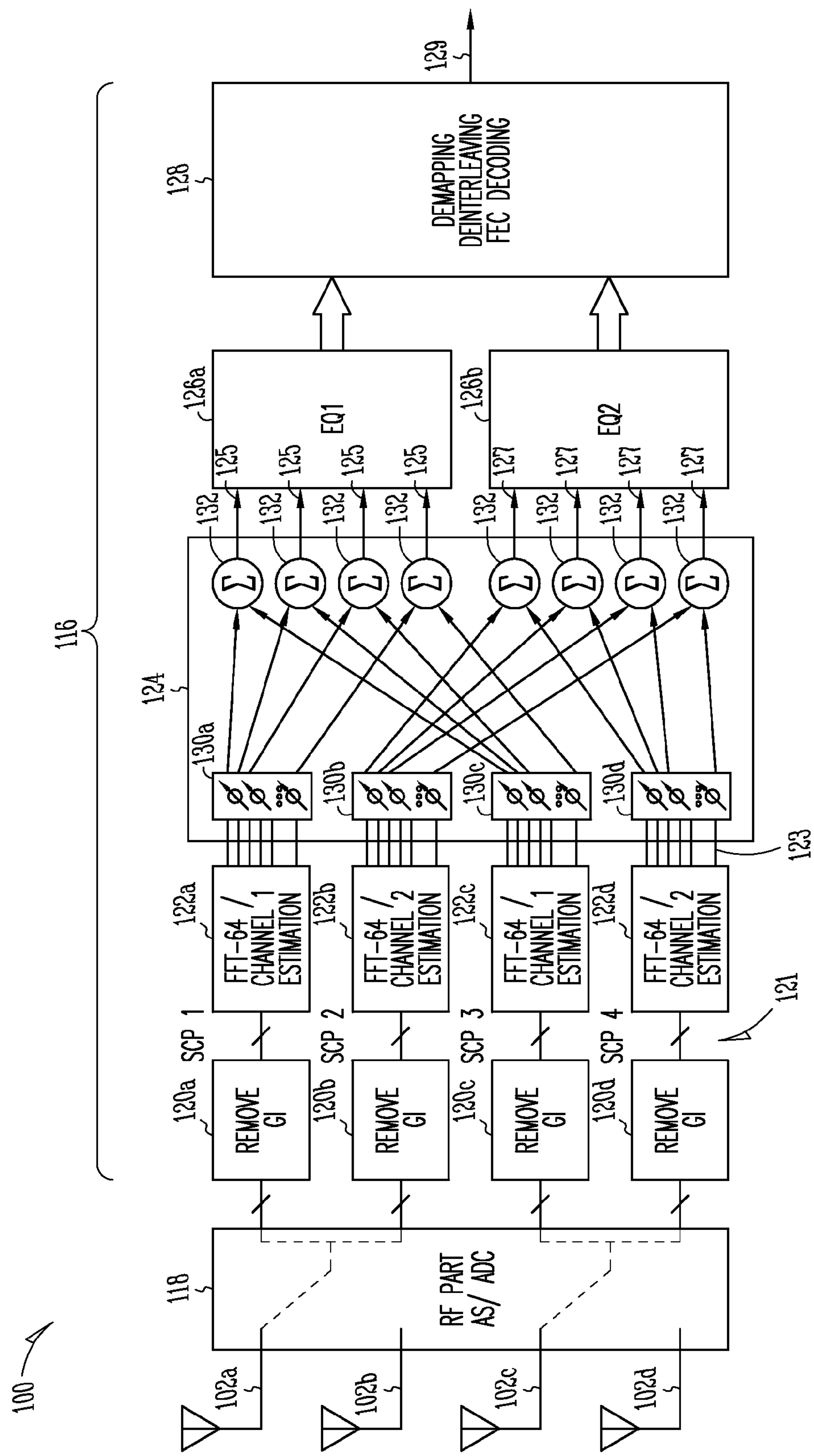

In referring to FIGS. 1A & 1B, receiver configuration 100 includes antenna selection (AS) circuitry 104 to select more than one antenna of a plurality of spatially diverse antennas 102*a-d* to receive an orthogonal frequency division multiplexed symbol over a wideband channel. The wideband channel may comprise more than one of a plurality of frequency-separated subchannels. Receiver configuration 100 may also include combining circuitry 124 to combine corresponding frequency domain symbol-modulated subcarriers 123 from the selected antennas to generate combined symbol-modulated subcarriers 125 and 127 for each subchannel of the wideband channel.

In some embodiments, antenna selection circuitry 104 may select a first antenna of the plurality of antennas 102*a-d* to receive two subchannels of a wideband channel, and the antenna selection circuitry 104 may also select a second antenna of the plurality of antennas 102*a-d* to further receive the two subchannels of the wideband channel. In some embodiments, antenna selection circuitry 104 may select two of antennas to receive two subchannels simultaneously. In some embodiments, antenna selection circuitry 104 may select the first and the second antennas based on a signal-to-noise ratio (SNR) of signals in the wideband channel. In some embodiments, antenna selection circuitry 104 may select the first and the second antennas based on an average SNR of signals in the wideband channel. In some embodiments, antenna selection circuitry may select the two antennas with the best average SNR for both subchannels.

Receiver configuration 100 may utilize low-noise amplifiers (LNAs) 106*a-b* for each selected antenna to amplify RF signals of more than one subchannel, and downconversion circuitry 108 to individually downconvert RF signals for each subchannel that is received through each antenna. For example, when two subchannels are received through two of antennas 102*a-d*, receiver configuration 100 may include first downconversion circuitry 108*a* to downconvert RF signals of the first subchannel received by the first antenna, second downconversion circuitry 108*b* to downconvert RF signals of the second subchannel received by the first antenna, third downconversion circuitry 108*c* to downconvert RF signals of the first subchannel received by the second antenna, and fourth downconversion circuitry 108*d* to downconvert RF signals of the second subchannel received by the second antenna. In embodiments, first low-noise amplifier 106*a* may amplify the RF signals from the first antenna, and second low-noise amplifier 106*b* may amplify the RF signals from the second antenna, although the scope of the embodiments is not limited in this respect. As illustrated, downconversion circuitry 108 may provide both in-phase (I-channel) components and quadrature-phase (Q-channel) components, although the scope of the embodiments is not limited in this respect.

In some embodiments, heterodyne frequency generating circuitry 110 may selectively generate one or more heterodyne frequencies to convert RF signals of the particular subchannels to baseband. The particular heterodyne frequency may depend on the particular subchannel. In some embodiments when two subchannels are received through two of antennas 102*a-d*, heterodyne frequency generating circuitry 110 may provide a first heterodyne frequency to first and third downconversion circuitry 108*a* and 108*c* to downconvert a first subchannel to baseband, and heterodyne frequency generating circuitry 110 may provide a second heterodyne frequency to second and fourth downconversion circuitry 108*b* and 108*d* to downconvert a second subchannel to baseband.

In some embodiments, heterodyne frequency generating circuitry 110 may comprise a fixed frequency voltage controlled oscillator (VCO) to generate a constant reference frequency, and a direct digital synthesizer (DDS) to generate a selected one of a plurality of stepped frequencies. Heterodyne frequency generating circuitry 110 may also comprise a frequency combiner to combine the reference frequency and the selected one of the stepped frequencies to generate the proper heterodyne frequency for each downconversion circuitry 108. In some embodiments, heterodyne frequency generating circuitry 110 may further comprise a phase-locked loop (PLL) synthesizer and a frequency divider to operate with the VCO to generate the heterodyne frequencies. Other configurations for selectively generating heterodyne frequencies may also be suitable for use with embodiments.

Receiver configuration 100 may also include low-pass filters (LPFs) 112*a-d* to filter and/or accumulate signal information received from associated downconversion circuitry 108 and analog-to-digital conversion (ADC) circuitry 114*a-d* to generate digital signals 115 for each subchannel received through each antenna. In some embodiments, digital signals 115 may comprise a serial symbol stream for each subchannel received through each antenna. Digital signals 115 provided by portion 118 of receiver configuration 100 may be processed in digital signal processing circuitry 116 to demodulate an OFDM symbol. In some embodiments, analog-to-digital conversion circuitry 114*a-d* may provide a serial symbol stream for both the I and Q channel components. In the embodiments illustrated in FIGS. 1A & 1B, four single channel pipelines (SCPs) are shown. A single channel pipeline is shown for each of two subchannels that are received by each of the two antennas; however the scope of the embodiments is not limited in this respect.

In some embodiments, receiver configuration 100 may also include circuitry 120*a-d* to remove a cyclic extension and/or guard interval (GI) from the serial symbol streams provided by analog-to-digital conversion circuitry 114*a-d*, although the scope of the embodiments is not limited in this respect. Serial symbol streams 121 may be converted to a parallel form for processing by fast Fourier transform (FFT) circuitry 122*a-d*. FFT circuitry 122*a-d* may perform a fast Fourier transform on the parallel groups of time-domain samples to generate frequency domain symbol-modulated subcarriers 123. In some embodiments, FFT circuitry 122*a-d* may also generate a channel estimate for each subcarrier of the received subchannels based on receipt of training symbols, although the scope of the embodiments is not limited in this respect.

Combining circuitry 124 may combine corresponding frequency domain symbol-modulated subcarriers of the same subchannel (received by different antennas) to generate combined symbol-modulated subcarriers 125 and 127. In some embodiments, combined symbol-modulated subcarriers 125 may be associated with a first subchannel, and combined symbol-modulated subcarriers 127 may be associated with a second subchannel, although the scope of the embodiments is not limited in this respect.

In some embodiments, combining circuitry 124 comprises maximum-ratio combining (MRC) circuitry having complex (i.e., I and Q) weighters 130*a-d* to weight the frequency domain symbol-modulated subcarriers prior to proportionally combining the corresponding frequency domain symbol-modulated subcarriers substantially proportional to their signal strength in combiners 132. In these embodiments, weighters 130*a-d* may, in addition to weighting, correct, adjust and/or phase-rotate a frequency domain symbol-modulated subcarrier to allow coherent signal combining in combiners 132.

Receiver configuration 100 may also include equalizer circuitry 126*a-b* to perform a channel equalization on symbol-modulated subcarriers 125 and 127, which may be received in parallel for each subcarrier. The channel equalization may be based on channel estimates provided by the FFT circuitry. In some embodiments, equalizer circuitry 126*a-b* may perform separate channel equalizations on the combined symbol-modulated subcarriers of an associated subchannel provided by the combining circuitry, although the scope of the embodiments is not limited in this respect.

In some embodiments, equalizer circuitry 126*a-b* may perform a channel equalization for further demapping the combined symbol-modulated subcarriers of each subchannel to generate parallel groups of bits from the subcarriers. Additional processing circuitry 128 may generate a single decoded bit stream, which may represent the orthogonal frequency division multiplexed symbol, from the parallel groups of bits of more than one subchannel. In some embodiments, additional processing circuitry 128 may include demapping circuitry, deinterleaving circuitry and/or decoding circuitry to generate the demodulated OFDM symbol. In some embodiments, subcanier demappers may demap the subcarriers of each subchannel in accordance with individual subcarrier modulation assignments particular to the subchannel to generate the parallel groups of bits. In some embodiments, a parallel-to-serial conversion may be performed prior to deinterleaving and/or decoding, and decoded bit stream 129 may be generated.

In some embodiments, the channel estimates generated by FFT circuitry 122*a-d* may comprise a channel response across the channel bandwidth. The channel estimates may be measured based on a channel-sounding preamble and may include a channel estimate for each subcarrier frequency. In some embodiments, FFT circuitry 122*a-d* may perform an FFT on known training symbols (e.g., the long training symbols) so that a channel estimation may be determined for each subchannel. In some embodiments, equalizer circuitry 126*a-b* may perform a channel equalization in the frequency domain with complex values that represent the channel estimate so that magnitudes of the frequency domain symbol-modulated subcarriers may be normalized and the phases of the frequency domain symbol-modulated subcarriers may be aligned to a zero origin to allow for further processing by circuitry 128.

In some embodiments, FFT circuitry 122*a-d* may comprise first FFT circuitry 122*a* to perform an FFT on parallel groups of time domain samples of a first subchannel from the first antenna to generate frequency domain symbol-modulated subcarriers of the first subchannel from the first antenna. FFT circuitry 122*a-d* may also include second FFT circuitry 122*b* to perform an FFT on parallel groups of time domain samples of a second subchannel from the first antenna to generate frequency domain symbol-modulated subcarriers of the second subchannel from the first antenna. FFT circuitry 122*a-d* may also include third FFT circuitry 122*c* to perform an FFT on parallel groups of time domain samples of the first subchannel from the second antenna to generate frequency domain symbol-modulated subcarriers of the first subchannel from the second antenna. FFT circuitry 122*a-d* may also include fourth FFT circuitry 122*d* to perform an FFT on parallel groups of time domain samples of the second subchannel from the second antenna to generate frequency domain symbol-modulated subcarriers of the second subchannel from the second antenna. In some embodiments, the OFDM symbol may be generated from the simultaneous receipt and processing of two subchannels through two antennas, although the scope of the embodiments is not limited in this respect.

Figure 2A:
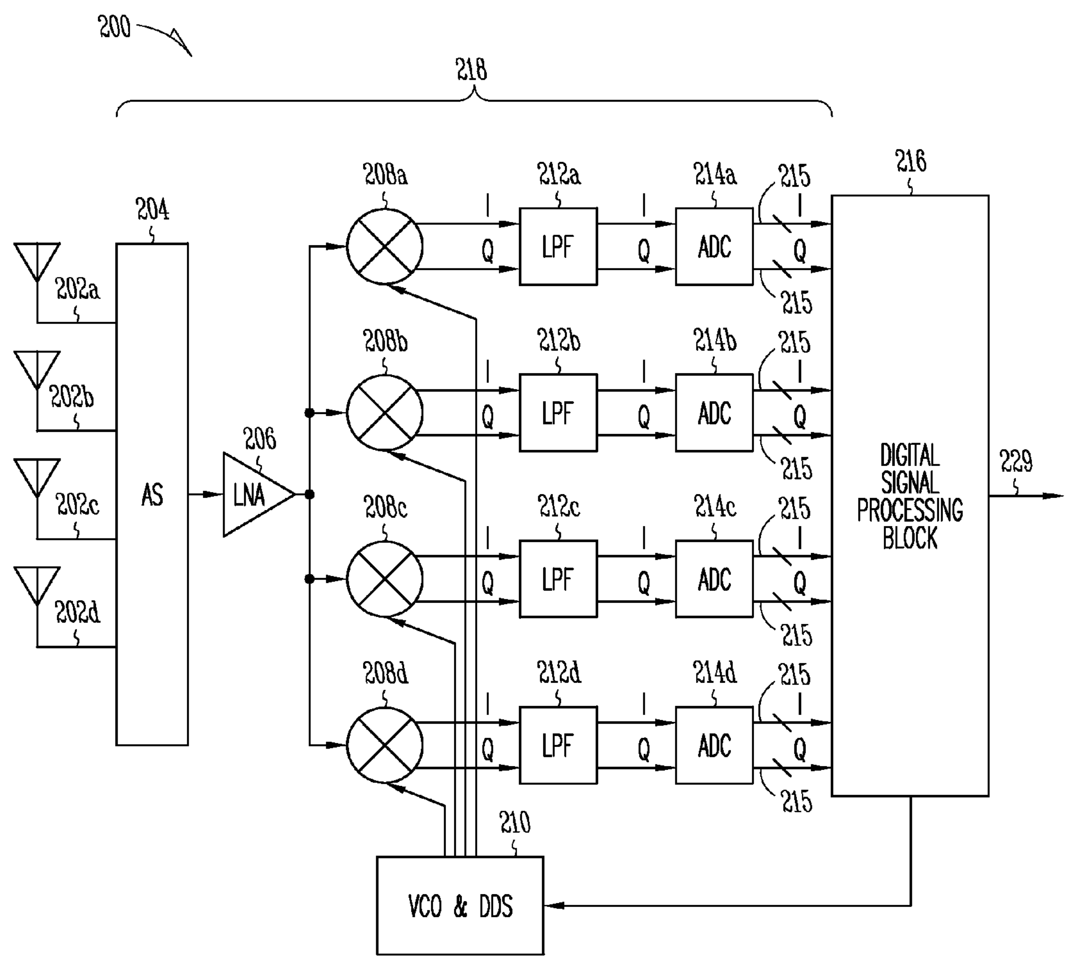
FIGS. 2A & 2B are block diagrams of a receiver in accordance with some embodiments.
Figure 2B:
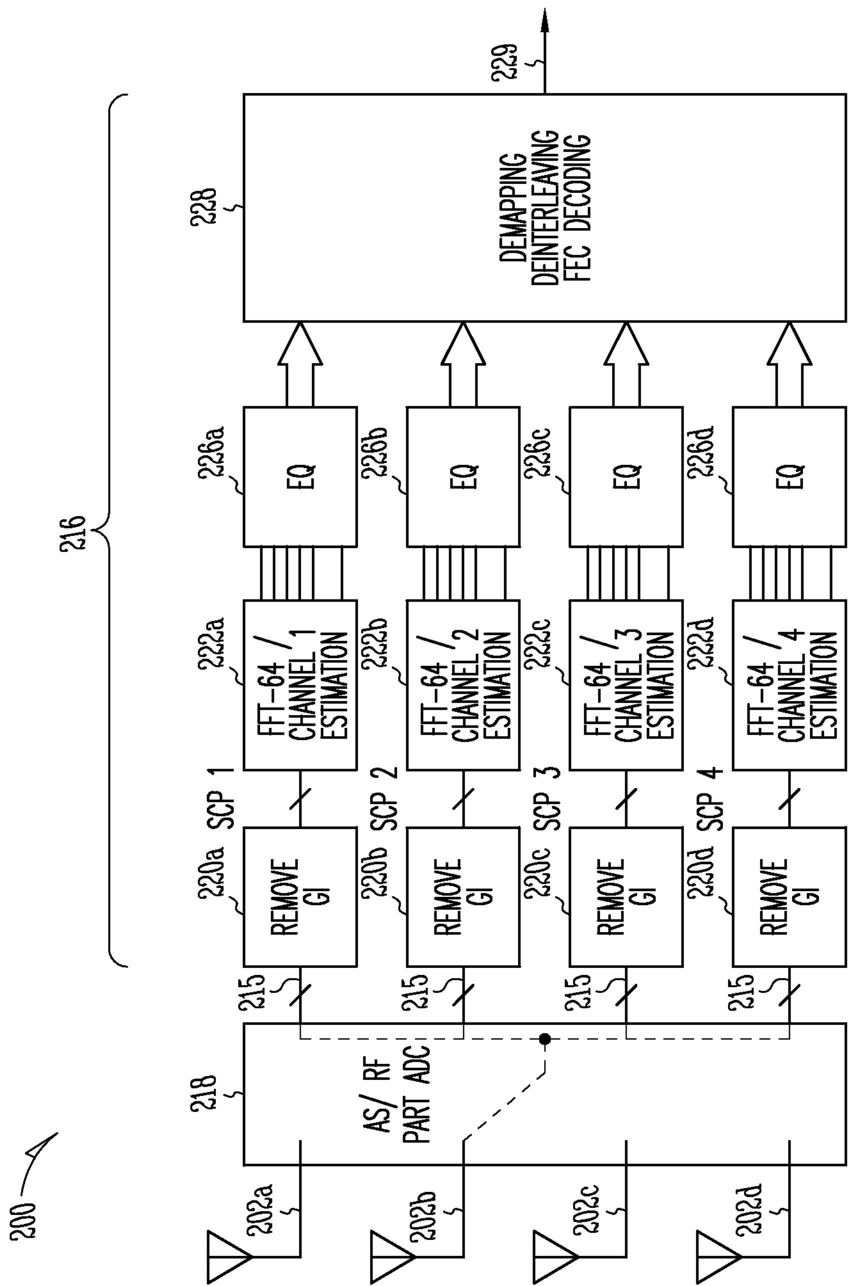
Figure 3A:
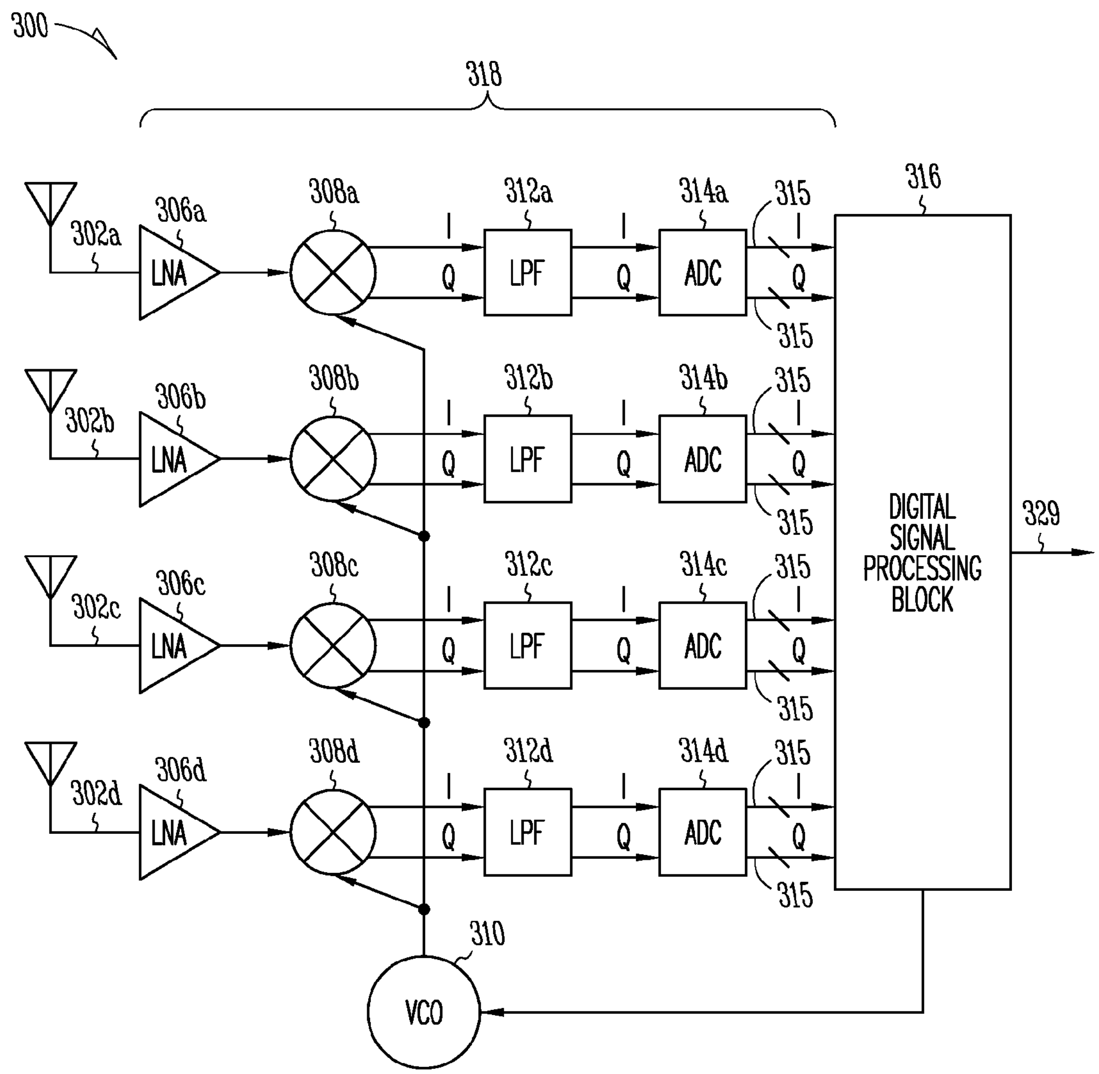
FIGS. 3A & 3B are block diagrams of a receiver in accordance with some embodiments.
Figure 3B:
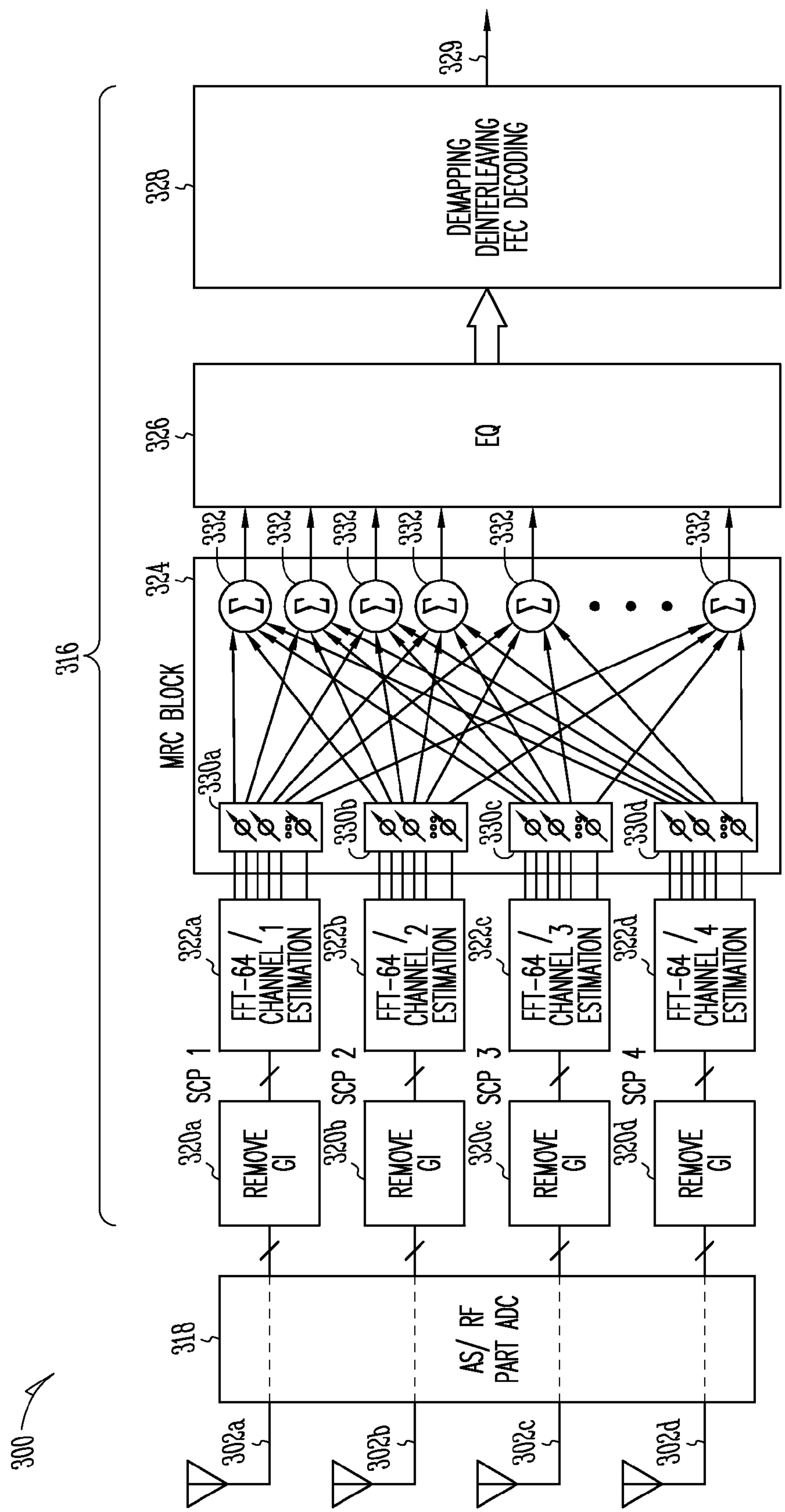

In referring to FIGS. 2A & 2B, receiver configuration 200 may receive more than one subchannel of a wideband OFDM channel through a single antenna selected from a plurality of spatially diverse antennas 202*a-d*. In some embodiments, receiver configuration 200 may comprise a single channel pipeline (SCP) for processing each subchannel.

Receiver configuration 200 may comprise antenna selection circuitry 204 to select one of a plurality of spatially diverse antennas 202*a-d* to receive an orthogonal frequency division multiplexed symbol over a wideband channel comprising more than one of a plurality of subchannels. LNA 206 may amplify the RF signals, and each subchannel may be separately downconverted by downconverters 208*a-d*, filtered by filters 212*a-d*, and converted to digital signals 215 by analog-to-digital conversion circuitry 214*a-d*. Digital signal processing circuitry 216 may comprise, among other things, subcarrier demodulators to demodulate frequency domain symbol-modulated subcarriers of the more than one subchannel to generate parallel groups of bits from the subcarriers. Digital signal processing circuitry 116 may also comprise additional processing circuitry to generate single decoded bit stream 229 representing the orthogonal frequency division multiplexed symbol from the more than one subchannel. In some embodiments, heterodyne frequency generating circuitry 210 may selectively generate a heterodyne frequency for each subchannel to convert RF signals of the particular subchannel to baseband.

As illustrated in FIG. 2B, digital signal processing circuitry 216 may receive digital signals 215 from portion 218 and may comprise four single channel pipelines (SCPs). In these embodiments, each single channel pipeline may process one subchannel, although the scope of the embodiments is not limited in this respect.

In some embodiments, receiver configuration 200 may also include circuitry 220*a-d* to remove a cyclic extension and/or guard interval (GI) from the serial symbol streams provided by analog-to-digital conversion circuitry 214*a-d*, although the scope of the embodiments is not limited in this respect. The serial symbol streams may be converted to a parallel form for processing by fast Fourier transform circuitry 222*a-d*. Fast Fourier transform circuitry 222*a-d* may perform a fast Fourier transform on the parallel groups of time-domain samples to generate frequency domain symbol-modulated subcarriers. Equalizer circuitry 226*a-d* may receive the symbol-modulated subcarriers, in parallel for each subcarrier, and it may perform an equalization based on the channel estimates. After equalization, the frequency domain symbol-modulated subcarriers may be demapped, and a parallel-to-serial conversion may be performed prior to deinterleaving and/or decoding by circuitry 228 to generate decoded bit stream 229. In some embodiments, the demodulated OFDM symbol may be generated from the simultaneous receipt and processing of four subchannels through one antenna, although the scope of the embodiments is not limited in this respect.

In referring to FIGS. 3A & 3B, receiver configuration 300 may receive a single subchannel by a plurality of spatially diverse antennas 302*a-d*, and maximum-ratio combining may be performed on corresponding symbol-modulated subcarriers received by the antennas. In some embodiments, receiver configuration 300 may comprise circuitry 318 to receive an orthogonal frequency division multiplexed symbol over a single subchannel through a plurality of spatially diverse antennas, and combining circuitry 324 to combine corresponding frequency domain symbol-modulated subcarriers from each of the antennas to generate combined symbol-modulated subcarriers for the single subchannel. LNAs 306*a-d* may amplify the received RF signals, and the RF signals from each antenna 302 may be separately downconverted by downconverters 308*a-d*, filtered by filters 312*a-d*, and converted to digital signals 315 by analog-to-digital conversion circuitry 314*a-d*. Since a single subchannel is being received, the signals from each antenna may use the same heterodyne frequency for downconversion, and accordingly VCO 310 may generate a single heterodyne frequency for each downconversion circuitry 308*a-d* to downconvert the RF signals from each antenna to baseband.

In some embodiments, receiver configuration 300 may comprise a single channel pipeline (SCP) for each antenna for the signals of the same subchannel. As illustrated in FIG. 3B, digital signal processing circuitry 316 may comprise four single channel pipelines. Each pipeline may process signals from one antenna, although the scope of the embodiments is not limited in this respect.

In some embodiments, receiver configuration 300 may also include circuitry 320*a-d* to remove a cyclic extension and/or guard interval (GI) from the serial symbol streams provided by analog-to-digital conversion circuitry 314*a-d*, although the scope of the embodiments is not limited in this respect. The serial symbol streams may be converted to a parallel form for FFT circuitry 322*a-d*. FFT circuitry 322*a-d* may perform a fast Fourier transform on the parallel groups of time-domain samples to generate frequency domain symbol-modulated subcarriers. Equalizer circuitry 326 may receive the symbol-modulated subcarriers, in a parallel form for each subcarrier, and it may perform an equalization based on the channel estimates. After equalization, the frequency domain symbol-modulated subcarriers may be demapped, and a parallel-to-serial conversion may be performed prior to deinterleaving and/or decoding by circuitry 328 to generate decoded bit stream 329. In some embodiments, the OFDM symbol may be demodulated from the simultaneous receipt and processing of one subchannel through four antennas, although the scope of the embodiments is not limited in this respect.

In some embodiments, combining circuitry 324 comprises maximum-ratio combining (MRC) circuitry having complex (i.e., I and Q) weighters 330*a-d* to weight the frequency domain symbol-modulated subcarriers prior to proportionally combining the corresponding frequency domain symbol-modulated subcarriers substantially proportional to their signal strength in combiners 332. In these embodiments, weighters 330*a-d* may, in addition to weighting, correct, adjust and/or phase-rotate a frequency domain symbol-modulated subcarrier to allow coherent signal combining in combiners 332. In some embodiments, receiver configuration 300 may include one of combiners 332 for each subcarrier.

Although the receiver configurations 100 (FIGS. 1A & 1B), 200 (FIGS. 2A & 2B) and 300 (FIGS. 3A & 3B) are illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Antennas 102*a-d* (FIGS. 1A & 1B), 202*a-d* (FIGS. 2A & 2B) and 302*a-d* (FIGS. 3A & 3B) may comprise directional or omnidirectional antennas, including, for example, dipole antennas, monopole antennas, loop antennas, microstrip antennas or other types of antennas suitable for reception of RF signals by the receivers.

In some embodiments, a reconfigurable receiver is provided. The reconfigurable receiver may comprise antenna selection circuitry to select one or more of a plurality of spatially diverse antennas to receive one or more of a plurality of subchannels. The reconfigurable receiver may also comprise maximum-ratio combining circuitry to combine, when more than one antenna per subchannel is selected, corresponding symbol-modulated subcarrier of subchannels from different selected antennas. In some embodiments, the antenna selection circuitry may select at least one antenna of the plurality to receive either three or four subchannels when a high-throughput mode is enabled. In some embodiments, the antenna selection circuitry may select up to four of the antennas to receive a single subchannel when an increased-range mode is enabled. In some embodiments, the antenna selection circuitry may select at least two of the antennas to simultaneously receive two of the subchannels when the increased-range and the high-throughput modes are enabled. The antenna selection circuitry may select the antennas based on an average signal-to-noise ratio of the subchannels, although the scope of the embodiments is not limited in this respect.

In some embodiments, the reconfigurable receiver may comprise up to four or more single channel pipelines to process signals. In some embodiments, when the high-throughput mode is enabled, each single channel pipeline may process signals from an associated one of the either three of four subchannels. In some embodiments, when the increased-range mode is enabled, each single channel pipeline may process signals of the single subchannel received by an associated one of the selected antennas. In some embodiments, when the increased-range and the high-throughput modes are both enabled, a first single channel pipeline may process signals of a first subchannel received by a first of the selected antennas, a second single channel pipeline may process signals of a second subchannel received by the first antenna, a third single channel pipeline may process signals of the first subchannel received by a second of the selected antennas, and a fourth single channel pipeline may process signals of the second subchannel received by the second of the selected antennas.

Figure 4:
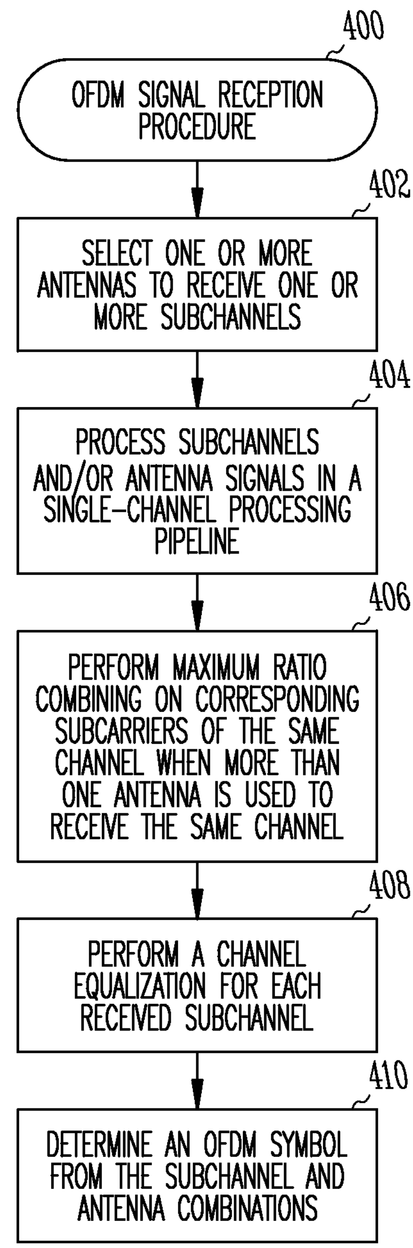
FIG. 4 is a flow chart of an OFDM signal reception procedure in accordance with some embodiments.

FIG. 4 is a flow chart of an OFDM signal reception procedure in accordance with some embodiments. The operations of procedure 400 may be performed by an OFDM receiver, such as a receiver in accordance with receiver configuration 100 (FIGS. 1A & 1B), receiver configuration 200 (FIGS. 2A & 2B), and/or receiver configuration 300 (FIGS. 3A & 3B), although other receivers may also be suitable to perform the operations of procedure 400. In general, procedure 400 may receive OFDM communications over one or more subchannels through one or more antennas, and it may selectively trade off between throughput and range in a WLAN environment. Although the individual operations of procedure 400 are illustrated and described as separate operations, one or more of the individual operations may be performed concurrently, and nothing requires that the operations be performed in the order illustrated.

Operation 402 may select among one or more antennas to receive one or more subchannels. In some embodiments, operation 402 may select one antenna to receive up to four or more subchannels, which may provide increased throughput with a more limited range. In other embodiments, operation 402 may select up to four or more antennas to receive a single subchannel, which may provide an increased range with reduced throughput. In yet other embodiments, operation 402 may select more than one antenna to receive more than one subchannel to provide an increased throughput and an increased range. For example, operation 402 may select two antennas to each receive two subchannels each, although the scope of the embodiments is not limited in this respect Operation 404 may process signals in single-channel pipelines. For example, when a single antenna is used to receive up to four or more subchannels, each subchannel may be processed in a single-channel pipeline. For example, when more than one antenna is used to receive a single subchannel, the same subchannel-signals from each antenna may be processed in a single-channel pipeline. For example, when more than one antenna is used to each receive more than one subchannel, each subchannel may be processed in a corresponding single-channel pipeline. The single-channel pipeline may include, among other things, downconversion, analog-to-digital conversion, and performing FFTs to generate frequency domain symbol modulated subcarriers.

Operation 406 may combine outputs of the single-channel pipelines that represent the same subchannel. For example, operation 406 may combine corresponding frequency domain symbol modulated subcarriers of the same subchannel when more than one antenna is used to receive the same subchannel. In some embodiments, operation 406 may perform a maximum-ratio combining on the corresponding frequency domain symbol modulated subcarriers, although the scope of the embodiments is not limited in this respect. Operation 406 may optionally not be performed in some embodiments when a single antenna is used to receive one or more subchannels, or when the single-channel pipelines are used to receive different subchannels. Operation 406 may provide combined frequency domain symbol modulated subcarriers for each subchannel that is received.

Operation 408 may perform a channel equalization on the combined frequency domain symbol modulated subcarriers for each subchannel in embodiments that receive more than one subchannel. The subcarriers may be demodulated, and parallel groups of bits may be generated. Each parallel group may correspond to a subcarrier of a subchannel.

Operation 410 may receive parallel groups of bits for each subchannel for each subchannel and may determine an OFDM symbol from the bits for each subchannel. Operation 410 may include converting the parallel groups of bits for each subchannel to a serial form that may comprise one or more serial bit streams. Operation 410 may also include performing demapping, deinterleaving and/or decoding.

In some embodiments, the selection between increased range and increased throughput may be performed by a user of a wireless communication device. In other embodiments, the selection between increased range and increased throughput may be made by an application operating on the device. In these embodiments, the selection may be based on the requirements of the application and/or channel conditions. For example, for voice communications, greater range and lower throughput may be acceptable, while for data transfer, higher throughput may be desired.

Embodiments may be implemented in one or a combination of hardware, firmware and software. Embodiments may also be implemented as instructions stored on a machine-readable medium, which may be read and executed by at least one processor to perform the operations described herein. A machine-readable medium may include any mechanism for storing information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

What is claimed is:

1. A wireless communication device comprising:

a variable bandwidth receiver configurable receive OFDM symbols over different bandwidths using multiple antennas;

a transmitter configured to transmit a reference signal; and antenna selection circuitry to select some of the antennas, wherein the receiver is arranged to receive OFDM symbols over a wideband channel using the selected antennas by processing two or more sets of subcarriers and arranged to receive OFDM symbols over a subchannel by processing a single set of subcarriers using the selected antennas, wherein the transmitter is arranged to transmit data using the selected antennas, wherein two or more of the antennas are selected based on channel conditions determined from the transmitted reference signal, the selected antennas being a subset of the multiple antennas and include less than all of the antennas, and wherein each set of subcarriers comprise a predetermined number of subcarriers.

2. The wireless communication device of claim 1 wherein to process the two or more sets of subcarriers, the receiver is configured to perform an FFT on time-domain signals corresponding to the symbols received over the two or more sets of subcarriers, and wherein to process the single set of subcarriers, the receiver is configured to perform an FFT on time-domain signals corresponding to the symbols received over the single set.

3. The wireless communication device of claim 2 wherein the multiple antennas comprise a plurality of spatially diverse antennas, and wherein the receiver further comprises circuitry to combine signals received through multiple antennas.

4. The wireless communication device of claim 3 wherein the wireless communication device is part of a mobile station.

5. A mobile station having multiple antennas configured for receiving OFDM symbols over different bandwidths, the mobile station configured to:

transmit a reference signal;

select some of the antennas;

receive OFDM symbols over a wideband channel using the selected antennas by processing two or more sets of subcarriers; and receive OFDM symbols over a subchannel using the selected antennas by processing a single set of subcarriers, wherein the two or more of the antennas are selected based on channel conditions determined from the transmitted reference signal, the selected antennas being a subset of the multiple antennas, wherein each set of subcarriers comprise a predetermined number of subcarriers.

6. The mobile station of claim 5 wherein to process the two or more sets of subcarriers, the mobile station is configured to perform an FFT on time-domain signals corresponding to the symbols received over the two or more sets of subcarriers, and wherein to process the single set of subcarriers, the mobile station is configured to perform an FFT on time-domain signals corresponding to the symbols received over the single set of subcarriers.

7. The mobile station of claim 6 wherein the multiple antennas comprise a plurality of spatially diverse antennas, and wherein the receiver further comprises circuitry to combine signals received the multiple antennas.

8. A method for variable bandwidth reception performed by a variable bandwidth receiver, the method comprising:

transmitting a reference signal;

selecting some antennas for variable bandwidth reception from a set of multiple antennas;

receiving OFDM symbols over a wideband channel using the selected antennas by processing two or more sets of subcarriers;

receiving OFDM symbols over a subchannel using the selected antennas by processing a single set of subcarriers wherein the transmitter is arranged to transmit data using the selected antennas, wherein two or more of the antennas are selected based on channel conditions determined from the transmitted reference signal, the selected antennas being a subset of the multiple antennas and include less than all of the antennas, and wherein each set of subcarriers comprise a predetermined number of subcarriers.

9. The method of claim 8 wherein processing two or more sets of subcarriers comprises performing an FFT on time-domain signals corresponding to the symbols received over the two or more sets of subcarriers, and wherein processing the single set of subcarriers comprises performing an FFT on time-domain signals corresponding to the symbols received over the single set of subcarriers.

* * * * *

UNITED STATES PATENT AND TRADEMARK OFFICE

CERTIFICATE OF CORRECTION

PATENT NO. : 8,730,894 B2
APPLICATION NO. : 13/267134
DATED : May 20, 2014
INVENTOR(S) : Sadri et al.

It is certified that error appears in the above-identified patent and that said Letters Patent is hereby corrected as shown below:

On the title page, in item (75), in "Inventors", in column 1, line 5, delete "Dayydov" and insert --Davydov--, therefor On title page 3, in column 1, in item (56), under "Other Publications", line 41, delete "specifi" and insert --specification--, therefor On title page 3, in column 2, in item (56), under "Other Publications", line 9, delete "Nutter" and insert --Hutter--, therefor On title page 4, in column 2, in item (56), under "Other Publications", line 13, after "13 pgs.", insert --¶"European Application Serial No. 10193166.5, Response filed Nov. 01, 2013 to Examination Notification Art. 94(3) mailed Jul. 01, 2013", 11 pgs.--, therefor In the Claims In column 11, line 46, in Claim 1, before "receive", insert --to--, therefor In column 12, line 12, in Claim 3, after "through", insert --the--, therefor In column 12, line 45, in Claim 7, after "received", insert --through--, therefor In column 12, line 55-56, in Claim 8, delete "subcarriers" and insert --subcarriers;--, therefor Signed and Sealed this
Thirteenth Day of January, 2015

Michelle K. Lee
*Deputy Director of the United States Patent and Trademark Office*